United States Patent
Stacy (10) Patent No.: US 8,844,080 B2
(45) Date of Patent: Sep. 30, 2014

(54) THUMB-MOUNTABLE PROTECTIVE UTENSIL SYSTEM AND KIT

(71) Applicant: Gregory Stacy, Los Angeles, CA (US)

(72) Inventor: Gregory Stacy, Los Angeles, CA (US)

(73) Assignee: CT USA LLC, Puyallup, WA (US)

( * ) Notice: Subject to any disclaimer, the term of this patent is extended or adjusted under 35 U.S.C. 154(b) by 0 days.

(21) Appl. No.: 14/125,172

(22) PCT Filed: Nov. 9, 2012

(86) PCT No.: PCT/US2012/064491
§ 371 (c)(1),
(2), (4) Date: Dec. 10, 2013

(87) PCT Pub. No.: WO2013/071139
PCT Pub. Date: May 16, 2013

(65) Prior Publication Data
US 2014/0090179 A1    Apr. 3, 2014

Related U.S. Application Data (60) Provisional application No. 61/558,046, filed on Nov. 10, 2011.

(51) Int. Cl.
*A47J 43/28* (2006.01)
*A41D 19/015* (2006.01)
*A47J 43/25* (2006.01)

(52) U.S. Cl.
CPC ............... *A47J 43/288* (2013.01); *A47J 43/28* (2013.01); *A47J 43/25* (2013.01)
USPC ........................................ 7/113; 2/21; 2/163

(58) Field of Classification Search
USPC ............ 7/113, 121; 2/21, 159, 160, 163, 167, 2/168; 15/167.1, 227, 184
See application file for complete search history.

(56) References Cited

U.S. PATENT DOCUMENTS

| | | | |
|---|---|---|---|
| 3,734,003 A | 5/1973 | Gerson | |
| 5,234,142 A | 8/1993 | Loewen et al. | |
| 5,711,027 A | 1/1998 | Katz et al. | |
| 5,826,599 A * | 10/1998 | Adams .......................... | 132/308 |
| 6,237,148 B1 | 5/2001 | Graham | |
| 6,729,510 B1 | 5/2004 | Romanov | |

(Continued)

FOREIGN PATENT DOCUMENTS

| | | |
|---|---|---|
| KR | 200232285 Y1 | 9/2001 |
| KR | 2020110010057 U | 10/2011 |

OTHER PUBLICATIONS

International Search Report and Written Opinion in parent PCT International Phase Application No. PCT/US2012/064491.

*Primary Examiner* — Robert Scruggs
(74) *Attorney, Agent, or Firm* — Lance M. Pritikin (57) ABSTRACT

A thumb-mountable protective utensil system and kit comprises a protective housing, a utensil mount and one or more utensil elements, each of which may be attachable to and detachable from the mount. The housing includes a cavity configured to generally conformingly receive a tip segment of a human thumb for snug securement of the housing thereto. The system is adapted to provide protection from cuts, and can accommodate a variety of thumb sizes by incorporating one or more shim elements which are capable of being attached to and removed from the housing. Examples of variations on the utensil element may include a spiked utensil, a grater utensil and a peeler utensil.

15 Claims, 9 Drawing Sheets

(56) References Cited

U.S. PATENT DOCUMENTS 7,743,690 B2 6/2010 White et al.
2003/0056274 A1 3/2003 Sorrels
2004/0098868 A1 5/2004 Pieper

* cited by examiner

THUMB-MOUNTABLE PROTECTIVE UTENSIL SYSTEM AND KIT

RELATED APPLICATIONS

This application claims the benefit of U.S. Provisional Application No. 61/558,046 filed on Nov. 10, 2011, the contents of which are incorporated by this reference in its entirety for all purposes as if fully set forth herein.

TECHNICAL FIELD

The present invention relates generally to utensils attached to fingers for use in preparing or manipulating food items or other objects, and to protect the finger in the process. More particularly, the present invention provides systems and kits for protectively securing kitchen utensils to a human thumb.

BACKGROUND

In the world of food preparation, avoiding waste and maximizing the efficiency of the preparation process are common priorities. Unfortunately, this frequently leads to significant injuries in the kitchen, particularly because the chef or other food preparer is often compelled to cut quickly and as closely as possible to the fingers holding the food item being sliced. Moreover, since time management is an important element in proper and efficient food preparation, it is generally desirable for the chef to have all of the necessary utensils close at hand. What is needed is a cost-effective utensil system which protects the thumb of the food preparer during close cutting operations, while also providing one or more compact, lightweight and easily manipulated utensils for convenient attachment and removal from the protective portion of the system.

SUMMARY

A thumb-mountable protective utensil system in accordance with the present invention addresses one or more of the apparent deficiencies of the prior art. Such a system may include a protective housing, a utensil mount and one or more utensil elements which, in certain embodiments, can be conveniently attached to and removed from the mount. The housing may be made of a single component, or two or more separate components permanently or temporarily joined, for example, by a clip. The housing may also include an extension flange to provide additional protection to the top portion of the thumb, particularly at the top knuckle and base segment of the thumb. A cavity within the housing can conveniently and conformingly receive the tip segment of a user's thumb. Some of these systems may employ a utensil latch which can be actuated by the user in order to latch and unlatch a particular utensil from the mount. In other systems, the utensil may be secured to the mount by way of, for example, frictional engagement or mutually cooperative male-female features.

The system may further include one or more shim element to allow the system to accommodate thumbs of various shapes and sizes. Such shims may be capable of being repeatedly inserted and removed from the housing, and may include features which interface with cooperative features in the housing, thereby improving the securement of the shim within the housing during the system's use.

The utensil elements can be a spiked utensil, a grater utensil, a peeler utensil, or any number of other kitchen or workshop utensils which would be convenient to have rigidly attached to the thumb. For example, a spiked utensil may be particularly useful in allowing the food preparer to safely hold a round vegetable or fruit while cutting the last few slices in progressively greater proximity to the user's thumb. The components of the system may preferably be made of materials approved by the FDA for use in food preparation, including certain polymers and metals.

BRIEF DESCRIPTION OF THE DRAWINGS

Further advantages of the present invention may become apparent to those skilled in the art with the benefit of the following detailed description of the preferred embodiments and upon reference to the accompanying drawings in which.

DETAILED DESCRIPTION OF THE PREFERRED EMBODIMENTS

Referring now to the drawings, like reference numerals designate identical or corresponding features throughout the several views. Embodiments of a thumb-mountable protective utensil system and kit are shown generally at 100, 174 and 176, and may typically comprise a housing 102, a utensil mount 120, and a utensil element, various examples of which are shown at 122, 124 and 126.

A housing 102 may include an upper portion 104, a lower portion 106, a cavity 108 defined generally therebetween, a forward end 110 and an open rearward end 112. The cavity 108 may be configured to generally conformingly receive a tip segment 114 of a human finger, preferably, for example, a human thumb 116, by way of the open rearward end 112 for releasable securement of the tip segment 114 within the cavity such that the palmar aspect 118 of the respective received finger (thumb 116, for example) faces the lower portion 106. The cavity 108 of some embodiments may be capable of receiving more than a tip segment 114 of a thumb 116, while others may receive substantially only the tip segment 114. The housing 102 may be made substantially of a polymer, such as a thermoset polymer, hard elastomeric or rubber material. In some embodiments, the housing 102 may be made substantially of an appropriate metal.

In certain embodiments, the housing 102 may be initially formed as a single component, for example, in a single molding or casting operation, in which case the upper portion 104 and the lower portion 106 would essentially be separate portions of an integrally-formed component. Alternatively, the upper portion 104 and lower portion 106 may be initially formed as entirely separate components attachable to one another. In further embodiments, the housing 102 may be formed as a single component, but one in which the upper portion 104 and the lower portion 106 are connected by way of, for example, a living hinge. One of ordinary skill in the art would recognize that each of these potential approaches to forming the housing 102 presents its own set of potential advantages.

Figure 26:
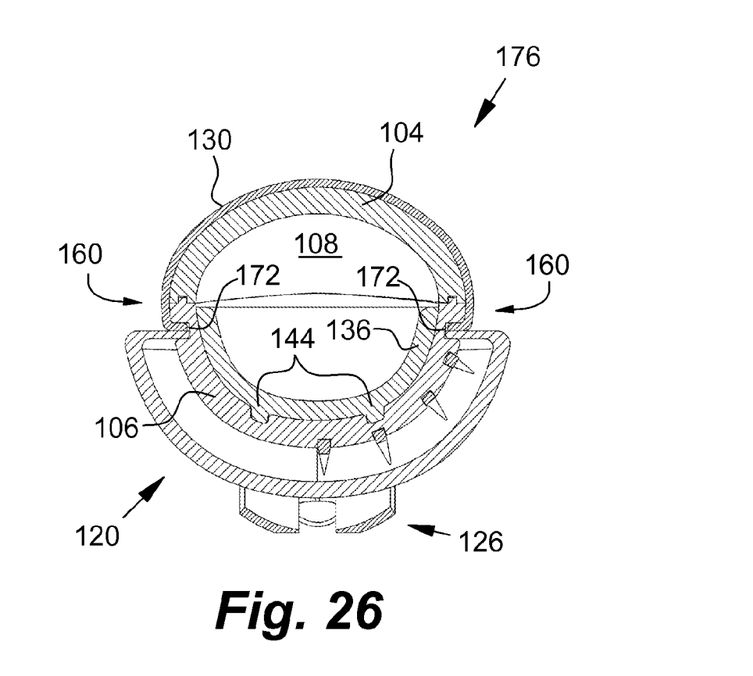
FIG. 26 is a diagrammatic cross-sectional view taken along line 26-26 in FIG. 25.

A utensil mount 120 may be generally rigidly connected to the lower portion 106, either directly or in some embodiments by way of the upper portion 104 or clip 130. This generally rigid connection may be made by way of, for example, integral formation of the housing 102 and utensil mount 120 in a single molding or casting operation. Alternatively, and in some cases preferably, the utensil mount 120 and the housing 102 may be initially formed separately, and then joined by way of, for example, snap-fit, press-fit, adhesive joint, ultrasonic weld, or some other conventional joining means appropriate in view of their respective materials. FIGS. 17-20 illustrate an example of such an embodiment 174, wherein the utensil mounts 120 are initially forms as strips upon which a spiked utensil is arranged, the strips being adapted to be matingly received by grooves 170 and permanently secured thereat. This may provide a less expensive approach to manufacturing particular embodiments of a system. In such an embodiment, the utensil mounts may be formed (e.g. molded from polycarbonate or the like) integrally with the spikes, then pressed, glued or welded in place within respective grooves 170. Alternatively, the strips and spikes may be integrally formed from stamped stainless steel, or even a die cast or sintered metal manufacturing method. In particular embodiments with molded utensil mounts 120 as shown, for example, in FIGS. 17-20, the mounts 120 and spikes 122 may be molded in a vertical fashion and may employ the use of lifters in the molding procedure. One skilled in the craft will be able to recognize the manufacturing procedure and what it entails to properly make. As illustrated for example in FIG. 26, the lower portion 106 may have a curved surface and a multiplicity of spikes extending outwardly therefrom in respective directions normal to the curved surface, and the utensil mount 120 may be configured to substantially shield the spikes when slidably engaged with the laterally-disposed utensil mount grooves 172.

A utensil element, such as those shown for example at 122, 124 and 126, may be configured to be in generally rigid engagement with the utensil mount 120. The rigid engagement may be releasable and repeatable, so that, for example, the particular utility element may be conveniently removed from the utensil mount 120 for cleaning or replacement. Further, certain kits in accordance with the present invention may include two or more utility elements of differing types which are interchangeable, in that each of which may be removable from the utensil mount 120 and replaced with one of the other utility elements.

A utensil element may be, for example, a spiked utensil 122 adapted to anchor a round vegetable or fruit such as a tomato or onion during a slicing operation, thereby allowing the user of the system 100 to slice closer to the edge of the food item and not waste the final piece or risk injuring their thumb 116. Other utensil elements may be, for example a grater utensil 124 or a peeler utensil 126. Scrubber and zester utensil elements are also contemplated, as well as other utensil elements which may be useful, for example, in the kitchen, factory or workshop environment. The utensil elements may be made, for example, from stamped sheet metal or other cost-effective conventional means.

In particular embodiments, the utensil mount 120 may include a pair of rail portions 150 laterally disposed generally along a first plane 152. In such embodiments, the utensil element (as shown, for example, at 122, 124 and 126) may include a pair of laterally disposed grooves 154 adapted to simultaneously slidingly receive the rail portions 150.

Figures 1, 2, 3:
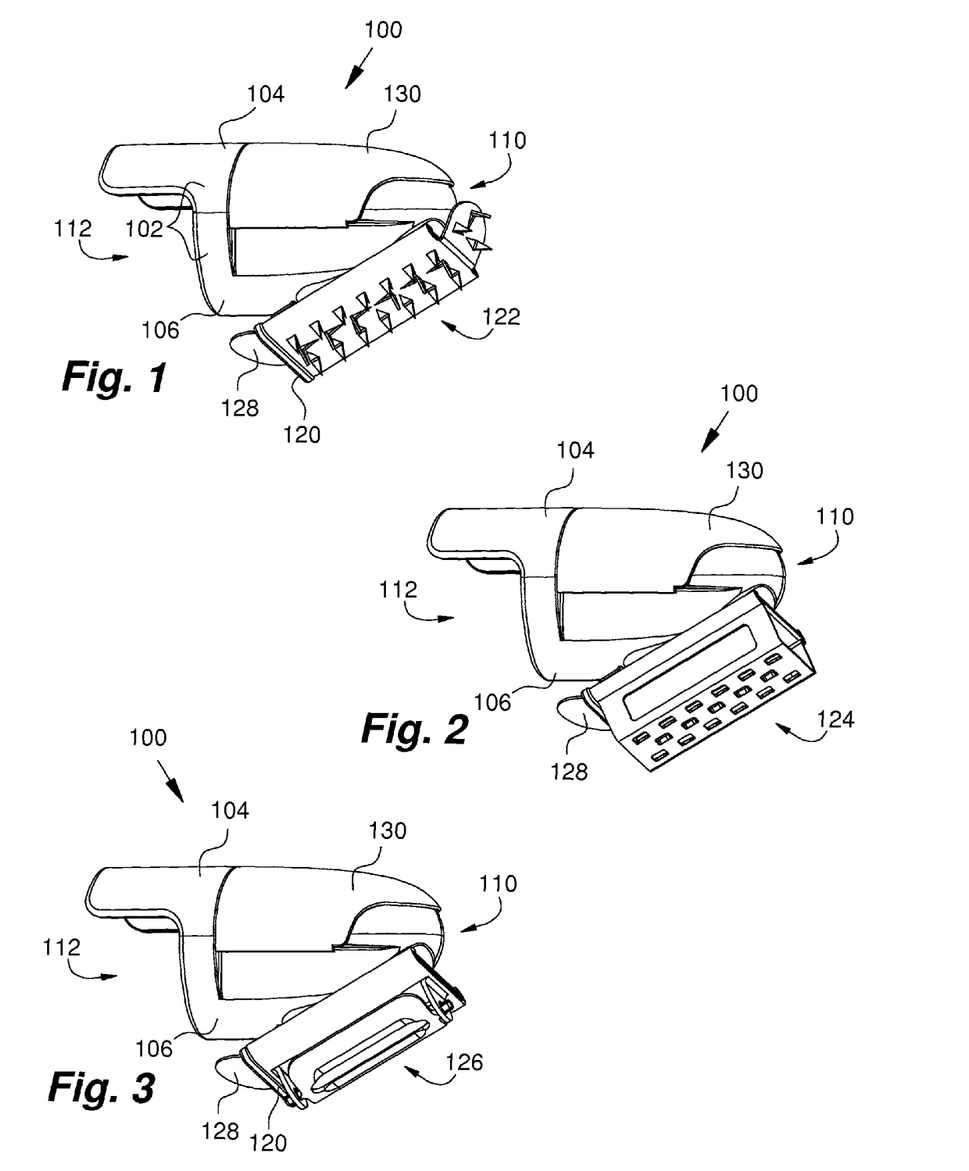
FIG. 1 is a diagrammatic perspective view of an embodiment of a thumb-mountable protective utensil system in accordance with the present invention, in which the system incorporates a spiked utensil element.
FIG. 2 is a diagrammatic perspective view of an embodiment similar to that shown in FIG. 1, but in which the system incorporates a grater utensil element.
FIG. 3 is a diagrammatic perspective view of an embodiment similar to that shown in FIG. 1, but in which the system incorporates a peeler utensil element.
Figure 4:
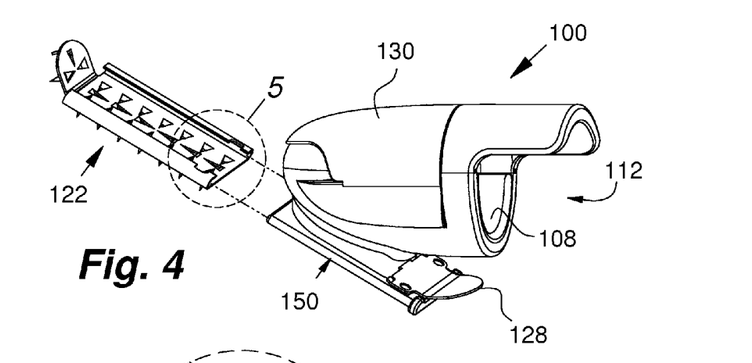
FIG. 4 is a diagrammatic perspective view of an embodiment similar to that shown in FIG. 1, but in which the spiked utensil element is removed from the utensil mount.
Figure 5:
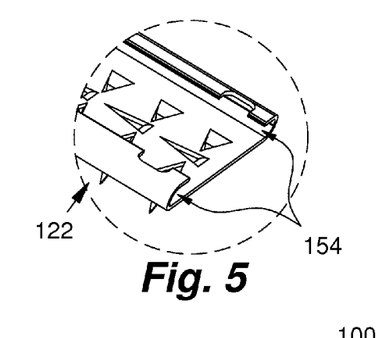
FIG. 5 is a diagrammatic enlarged view of detail 5 in FIG. 4.
Figure 6:
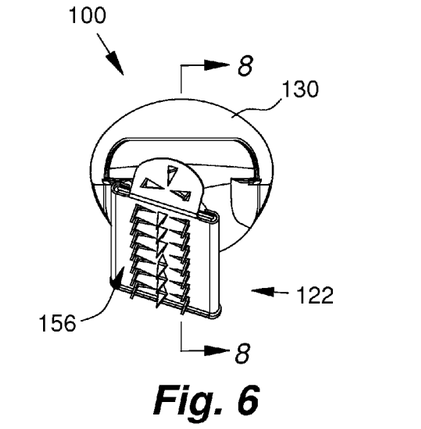
FIG. 6 is a diagrammatic front view of an embodiment similar to that shown in FIG. 1.
Figure 7:
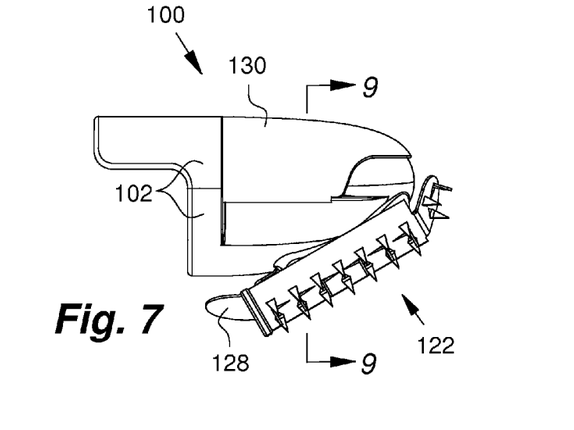
FIG. 7 is a diagrammatic side view of an embodiment similar to that shown in FIG. 1.

Embodiments which provide for the releasable and repeatable rigid engagement of the utensil element with a utensil mount 120 may do so largely in reliance on such mutually cooperative features. An illustration of the partial operation of such an adaptation is depicted, for example, in FIG. 4. It is envisioned that various alternative cooperative features may be used for enabling the releasable and repeatable rigid engagement between the utensil element and the utensil mount 120.

Certain embodiments may further comprise a utensil latch, such as the one shown, for example, at 128, which may be actuatable between a latching and an unlatching configuration. When the utensil latch 128 is in its latching configuration, it may be adapted to latch the respective utensil element in its generally rigid engagement with the utensil mount 120. Relatedly, when the utensil latch 128 is in its unlatching configuration, it may be further adapted to unlatch the respective utensil element from its rigid engagement with the utensil mount 120. A utensil latch 128 may be, for example, made substantially of a spring steel or a polymer. The utensil latch 128 may be flexibly biased toward the latching configuration. The user may overcome this bias by applying force to a portion of the utensil latch 128.

Particular embodiments of a system 100 may comprise a clip element 130 configured to releasably secure the upper portion 104 to the lower portion 106. Such a clip element 130 may find particular usefulness in embodiments in which the upper portion 104 and lower portion 106 are separate components attachable to one another, such as the embodiments depicted throughout the several figures. Further, in certain embodiments, the lower portion 104 may include two laterally-opposed shoulders 132 (see, for example, FIGS. 9-11). In such embodiments, the clip element 130 may be adapted to slidingly engage each of the shoulders 132 and extend across at least a portion of an outer surface 134 of the upper portion 104. In preferred embodiments, the clip element 130 is formed of a material substantially resistant to cuts from sharp blades during slicing operations, such as a metal or polymer possessing such material properties. In particular embodiments, the clip element 130 may be made substantially of, for example, a thermoset polymer. Whether the system 100 includes a clip element 130 or not, it is generally constructed to provide substantial protection against a cut or nick from a kitchen knife during normal slicing operations.

Figure 8:
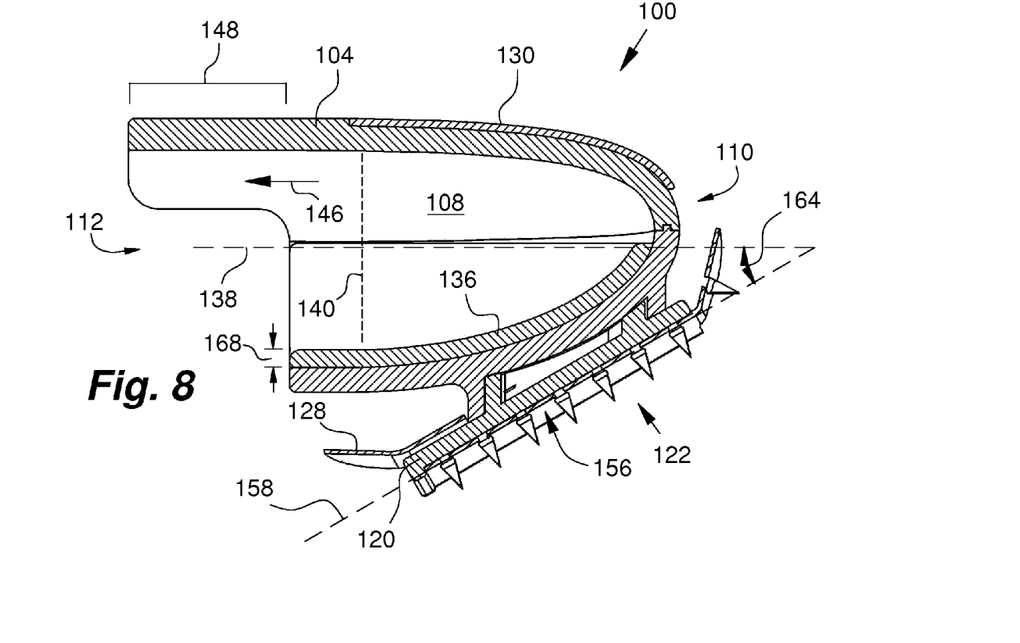
FIG. 8 is a diagrammatic cross-sectional view taken along line 8-8 in FIG. 6.

Certain embodiments of a system 100 may further comprise a spacer or shim element 136 to help maintain the tip segment 114 snuggly within the cavity 108, largely to adapt for variations in the size of the user's thumb 116. In such embodiments, the housing 102 may further include a first axis 138 extending from the forward end 110 toward the open rearward end 112. The cavity 108 has a cavity cross-section 140 (i.e., a two-dimensional cross-sectional area within the cavity) being generally orthogonal to the first axis 138. The planar edge of the cavity cross-section 140 is depicted in FIG. 8. The shim element 136 may be removably attachable to the housing 102 (for example, by way of insertion into the cavity 108) for reducing the cavity cross-section 140. In embodiments including one or more shim elements 136, the housing 102 and the shim element 136 may include complimentary engagement elements (see, for example, 142 and 144 in FIGS. 9-11). Such engagement elements may be configured to interengage to impede movement of the shim element 136 with respect to the housing 102 when the shim element 136 is removably attached to the housing 102 and the tip segment 114 is received within the cavity 108.

The shim elements 136 may, for example, be substantially made of resiliently compressible material such as a silicone rubber, Dynaflex™ G7940-1 or other suitable elastomeric material. Such soft, compressible material may be preferable in that in may improve the comfort of the user during prolonged use, allow the system to be more adaptive to varying thumb sizes, and with some such materials, may provide increased friction to prevent the shim element 136 from undesirably sliding within or out of the housing 102.

Figure 16:
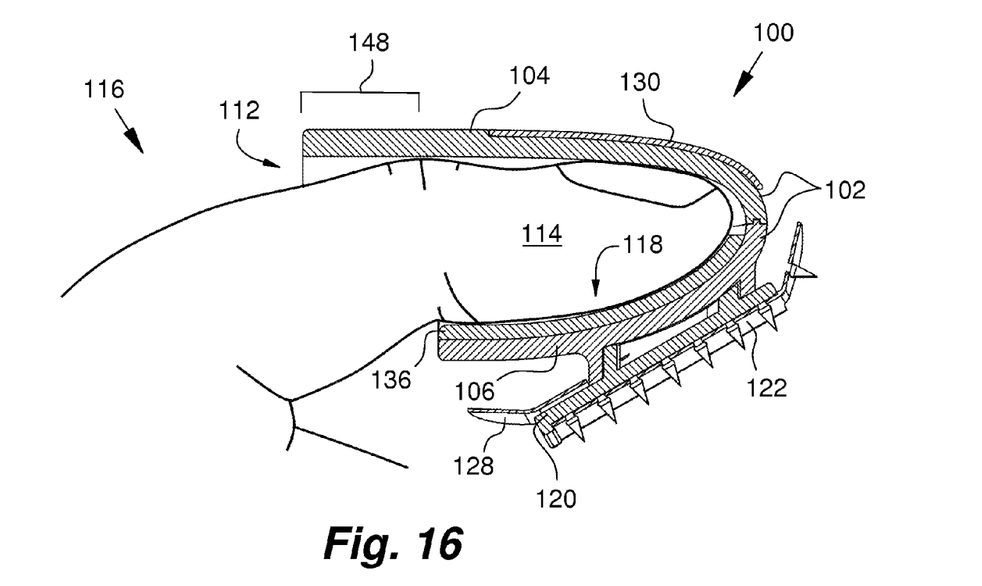
FIG. 16 is a diagrammatic cross-sectional view of an embodiment of a thumb-mountable protective utensil system showing a tip segment of a human thumb received within the cavity of the housing.
Figures 17, 18, 19, 20:
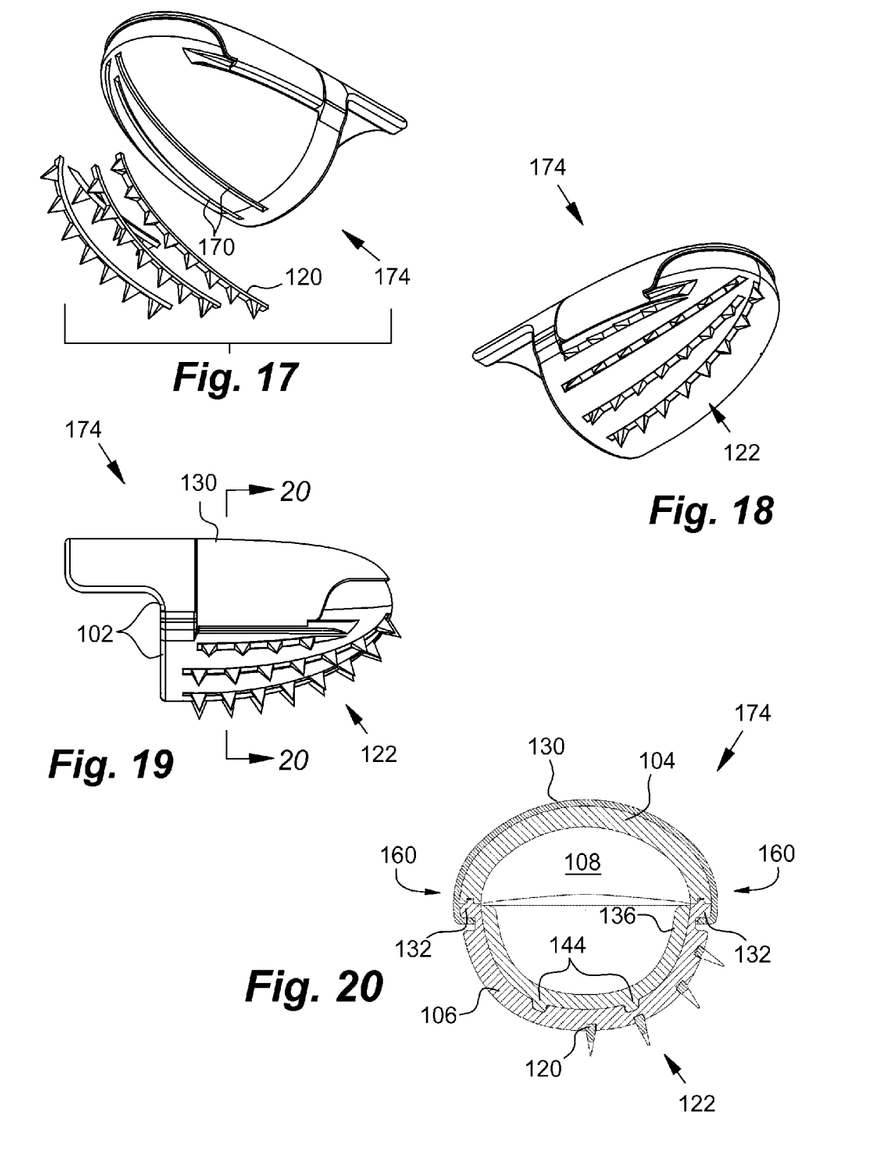
FIG. 17 is a diagrammatic partially exploded view of another embodiment of a thumb-mountable protective utensil system in accordance with the present invention, in which the utensil mounts and associated spike utensils are adapted to be permanently attached to the housing.
FIG. 18 is a diagrammatic perspective view of the embodiment of FIG. 17, illustrating the utensil mounts and associated spike utensils permanently attached to the housing by way of for example, glue, integral molding, RF weld or ultrasonic weld.
FIG. 19 is a diagrammatic side view of the embodiment of FIG. 18.
FIG. 20 is a diagrammatic cross-sectional view taken along line 20-20 in FIG. 19.
Figures 21, 22, 23, 24:
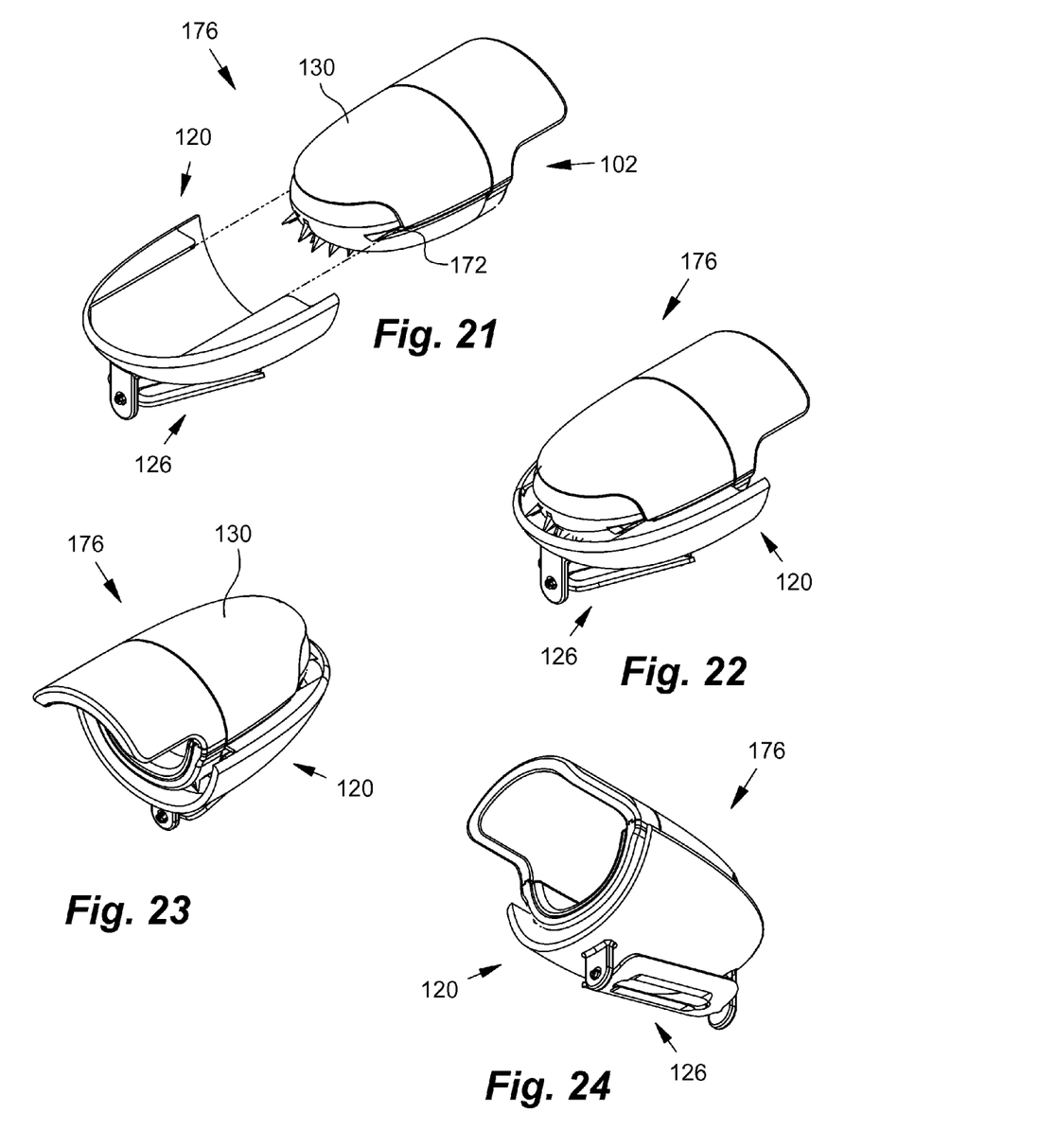
FIG. 21 is a diagrammatic partially exploded view of a further embodiment of a thumb-mountable protective utensil system in accordance with the present invention, in which the utensil mount is adapted to slidably engage laterally-disposed utensil mount grooves in the housing.
FIG. 22 is a diagrammatic perspective view of the embodiment of FIG. 21, illustrating the utensil mount in slidable rigid engagement with utensil mount grooves in the housing.
FIG. 23 is a further diagrammatic perspective view of the embodiment of FIG. 22.
FIG. 24 is another diagrammatic perspective view of the embodiment of FIG. 22.
Figure 25:
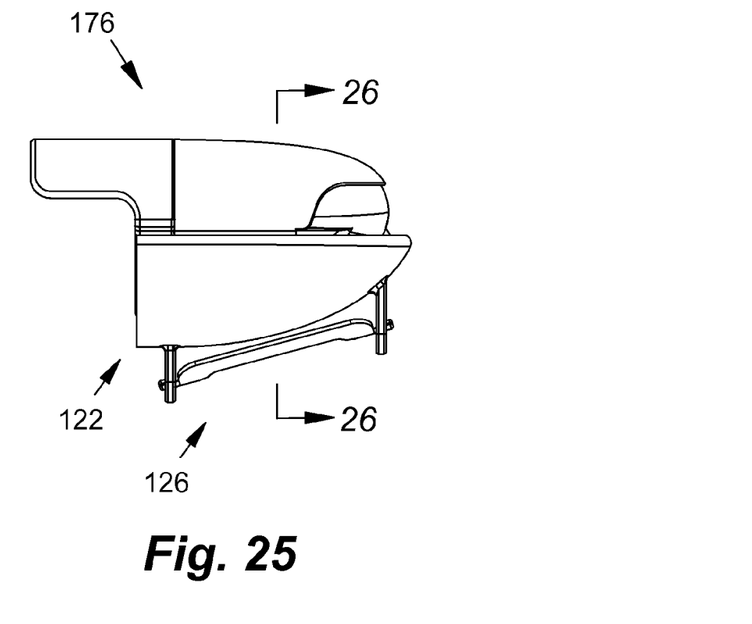
FIG. 25 is a diagrammatic side view of the embodiment of FIG. 22.

In particular embodiments, the upper portion 104 may include an extension flange 148 configured to extend beyond the lower portion 106 in a rearward direction 146 approximately parallel to the first axis 138. Such a feature may provide additional protection for the thumb of the user, as illustrated, for example, in FIG. 16.

In certain embodiments, the utensil element may include an operative face 156. The operative face 156 of a respective utility element may be, for example, a face upon which the respective operative features reside. The operative features on the spiked utensil element 122 may be individual spikes. The operative features on the grater utensil element 124 may be individual grating apertures, and so on. The operative face 156 may generally extend along a second plane 158 (see, for example, FIGS. 8 and 9). In particular such embodiments, the utensil element (for example, 122) and utensil mount 120 may be adapted such that the second plane 158 is angularly offset from the first axis 138 when the utensil element is in its generally rigid engagement with the utensil mount 120.

The housing 102 may further include opposing lateral sides 160 (see, for example, FIG. 9) and a second axis 162 which extends between the lateral sides 160 in a manner generally orthogonal to the first axis 138. In certain such embodiments, the utensil element (for example, 122) and utensil mount 120 are adapted such that the second plane 158 is angularly offset from the first axis 138 by a first angle 164 and from the second axis 162 by a second angle 166 when the utensil element 122 is in generally rigid engagement with the utensil mount 120. Depending on the particular embodiment, the first angle 164 may be approximately between 5 and 30 degrees, and the second angle 166 may be approximately between 5 and 40 degrees. In one preferred embodiment, the first angle 164 is approximately 30 degrees and the second angle 166 is approximately 20 degrees.

In particular embodiments, such as those illustrated at 176 in FIGS. 21-26 for example, the utensil mount 120 may be adapted to slidingly engage laterally-disposed utensil mount grooves 172 formed, for example, in housing 102 or clip 130. As a result, the utensil mount may be adapted to be rigidly and removably connected to the lower portion by way of sliding engagement therewith. Such slidable engagement may preferably be reversible and repeatable, allowing different utensils to be rigidly mounted to the same housing. In such an embodiment, the utensil mount 120 may preferably be formed of a thermoset polymer such as polycarbonate or ABS plastic. Alternatively metal, such as formed stainless steel or die cast metal could be used.

Figure 9:
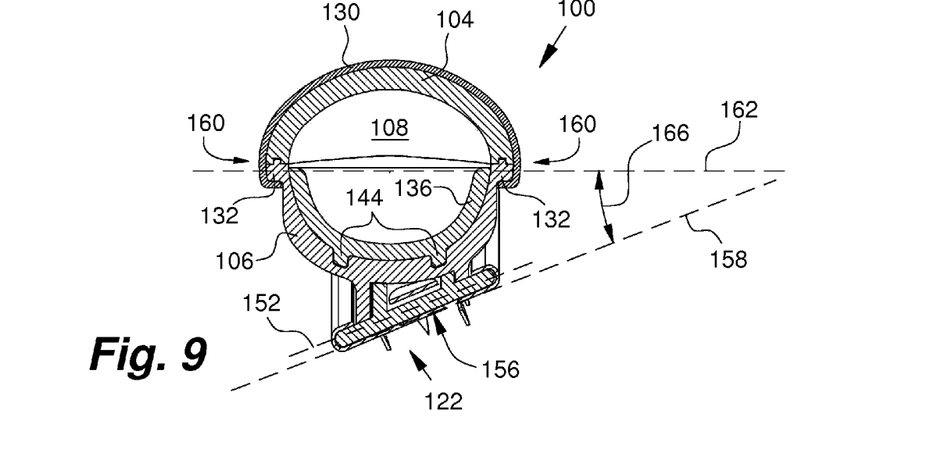
FIG. 9 is a diagrammatic cross-sectional view taken along line 9-9 in FIG. 7.
Figures 10, 11:
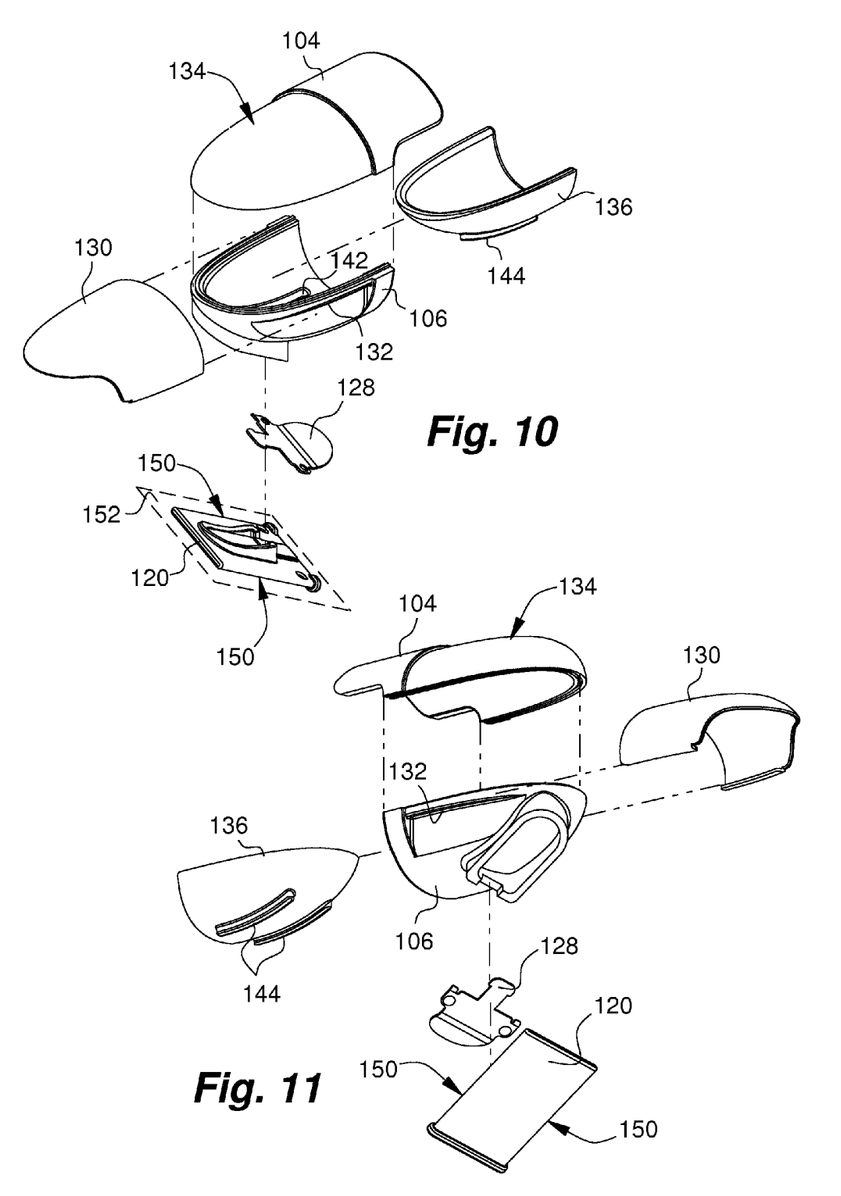
FIG. 10 is a diagrammatic exploded view of an embodiment of a thumb-mountable protective utensil system without a utensil element.
FIG. 11 is a further diagrammatic exploded view of the embodiment of FIG. 10.
Figure 12:
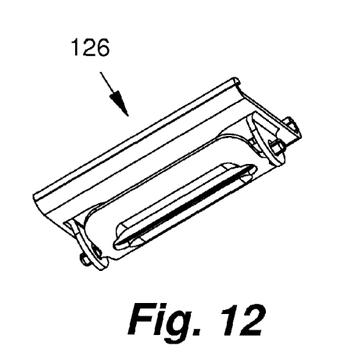
FIG. 12 is a diagrammatic perspective view of an example of a peeler utensil element.
Figure 13:
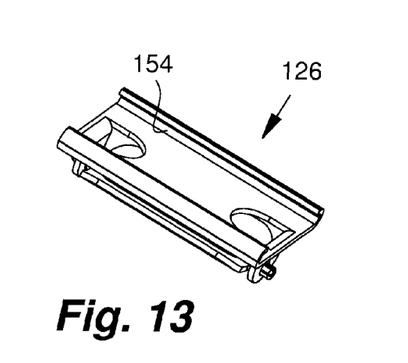
FIG. 13 is a further diagrammatic perspective view of the example in FIG. 12.
Figure 14:
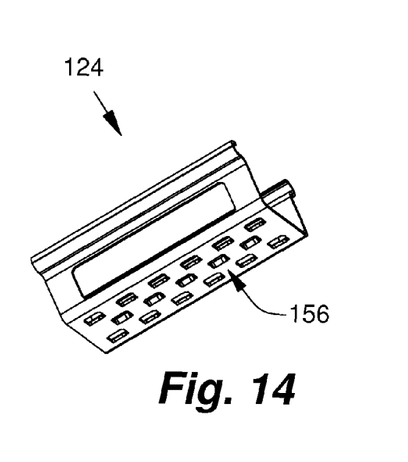
FIG. 14 is a diagrammatic perspective view of an example of a grater utensil element.
Figure 15:
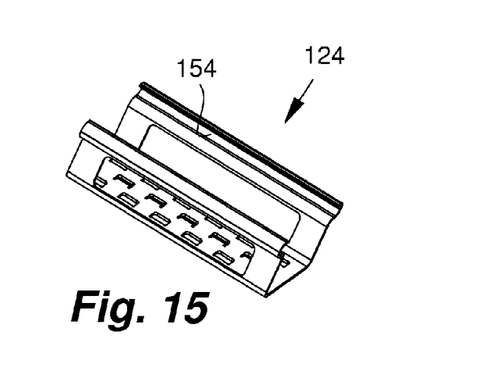
FIG. 15 is a further diagrammatic perspective view of the example in FIG. 12.

Kits may be provided which comprise all of the components of an embodiment of a single system 100, but also include a multiplicity of utensil elements (for example, one of each of utensil elements 122, 124 and 126) and a multiplicity of shim elements 136 having respective thicknesses 168 which vary from one shim element 136 to another. In kit embodiments having a multiplicity of shim elements 136, the shim elements 136 are each removably attachable to the housing 102 for reducing the cavity cross-section 140 such that the greater the thickness 168 of the respective shim element 136 which is attached to the housing 102, the greater the reduction in the cavity cross-section 140. Certain kit embodiments may also include, for example, two distinct sets of lower portions 106 and respective mounting elements 120, each set being uniquely adapted for a left-handed or right-handed user, respectively. By way of illustration, a system 100 incorporating one such set may have a general cross-section as shown in FIG. 9. Whereas that same system 100 incorporating the other such set may have a mirror opposite general cross-section (e.g., resulting in the second angle 166 being on the opposite side of the system 100).

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A thumb-mountable protective utensil system comprising:
   a housing including an upper portion, a lower portion, a cavity defined generally therebetween, a forward end and an open rearward end, the cavity being configured to generally conformingly receive a tip segment of a human thumb by way of the open rearward end for releasable securement of the tip segment within the cavity such that the palmar aspect of the thumb faces the lower portion;
   a utensil mount generally rigidly connected to the lower portion;
   a utensil element configured to be in generally rigid engagement with the utensil mount; and
   a clip element configured to releasably secure the upper portion to the lower portion,
   wherein the upper and lower portions are separate components attachable to one another.

2. A thumb-mountable protective utensil system comprising:
   a housing including an upper portion, a lower portion, a cavity defined generally therebetween, a forward end and an open rearward end, the cavity being configured to generally conformingly receive a tip segment of a human thumb by way of the open rearward end for releasable securement of the tip segment within the cavity such that the palmar aspect of the thumb faces the lower portion;
   a utensil mount generally rigidly connected to the lower portion;
   a utensil element configured to be in generally rigid engagement with the utensil mount; and
   a clip element, wherein the lower portion includes two laterally-opposed shoulders, the clip element is adapted to slidingly engage each of the shoulders and extend across at least a portion of an outer surface of the upper portion, and the clip element is formed of a material substantially resistant to cuts from sharp blades during slicing operations.

3. A thumb-mountable protective utensil system comprising:
   a housing including an upper portion, a lower portion, a cavity defined generally therebetween, a forward end, an open rearward end, and a first axis extending from the forward end toward the open rearward end, the cavity being configured to generally conformingly receive a tip segment of a human thumb by way of the open rearward end for releasable securement of the tip segment within the cavity such that the palmar aspect of the thumb faces the lower portion, the upper and lower portions being separate components attachable to one another, the lower portion including two laterally-opposed shoulders, the upper portion including an extension flange configured to extend beyond the open rearward end in a rearward direction approximately parallel to the first axis;
   a clip element adapted to slidingly engage each of the shoulders and extend across at least a portion of an outer surface of the upper portion for releasably securing the upper portion to the lower portion, the clip element being formed of a material substantially resistant to cuts from sharp blades during slicing operations;
   a utensil mount generally rigidly connected to the lower portion and including a pair of rail portions laterally disposed generally along a first plane; and
   a utensil element including a pair of laterally disposed grooves adapted to simultaneously slidingly receive the rail portions for placement of the utensil element in generally rigid engagement with the utensil mount.

4. A thumb-mountable protective utensil system as defined in claim 3 wherein the housing further includes opposing lateral sides and a second axis, the second axis extending between the lateral sides and being generally orthogonal to the first axis, the utensil element includes an operative face generally extending along a second plane, and the utensil element and utensil mount are adapted such that the second plane is angularly offset from the first axis by a first angle and from the second axis by a second angle when the utensil element is in generally rigid engagement with the utensil mount, the first angle being approximately between 5 and 40 degrees and the second angle being approximately between 5 and 30 degrees.

5. A thumb-mountable protective utensil kit comprising:
   a housing including an upper portion, a lower portion, a cavity defined generally therebetween, a forward end, an open rearward end, and a first axis extending from the forward end toward the open rearward end, the cavity being configured to generally conformingly receive a tip segment of a human thumb by way of the open rearward end for releasable securement of the tip segment within the cavity such that the palmar aspect of the thumb faces the lower portion;
   a utensil mount generally rigidly connected to the lower portion;
   a multiplicity of utensil elements each being configured to be placed in generally rigid engagement with the utensil mount in a manner which is releasable and repeatable, at least one of the utensil elements being a spiked utensil, a grating utensil or a peeling utensil; and
   a clip element formed of a material substantially resistant to cuts from sharp blades during slicing operations, wherein the upper and lower portions are separate components attachable to one another and the clip element is configured to releasably secure the upper portion to the lower portion.

6. A thumb-mountable protective utensil kit comprising:
   a housing including an upper portion, a lower portion, a cavity defined generally therebetween, a forward end, an open rearward end, and a first axis extending from the forward end toward the open rearward end, the cavity being configured to generally conformingly receive a tip segment of a human thumb by way of the open rearward end for releasable securement of the tip segment within the cavity such that the palmar aspect of the thumb faces the lower portion, the upper and lower portions being separate components attachable to one another, the lower portion including two laterally-opposed shoulders, the upper portion including an extension flange configured to extend beyond the open rearward end in a rearward direction approximately parallel to the first axis;
   a clip element adapted to slidingly engage each of the shoulders and extend across at least a portion of an outer surface of the upper portion for releasably securing the upper portion to the lower portion, the clip element being formed of a material substantially resistant to cuts from sharp blades during slicing operations; and at least one utensil mount adapted to slidably engage laterally-disposed utensil mount grooves in the housing, the utensil mount having a utensil element connected thereto.

7. A thumb-mountable protective utensil kit as defined in claim 6 wherein the clip element is metal.

8. A thumb-mountable protective utensil kit as defined in claim 6 wherein the laterally-disposed utensil mount grooves are partially defined by the laterally-opposed shoulders.

9. A thumb-mountable protective utensil kit as defined in claim 6 wherein the utensil element is a peeling utensil or a grating utensil.

10. A thumb-mountable protective utensil kit as defined in claim 6 wherein:
 the lower portion has a curved surface and a multiplicity of spikes extending outwardly therefrom, and
 the utensil mount is configured to substantially shield the spikes when slidably engaged with the laterally-disposed utensil mount grooves.

11. A thumb-mountable protective utensil kit as defined in claim 10 wherein the multiplicity of spikes extend outwardly from the curved surface in respective directions normal thereto.

12. A thumb-mountable protective utensil kit as defined in claim 6 further comprising a multiplicity of shim elements substantially made of resiliently compressible material and having respective thicknesses which vary from one another, wherein
 the cavity has a cavity cross-section being generally orthogonal to the first axis, and
 the shim elements are each removably attachable to the housing for reducing the cavity cross-section such that the greater the thickness of the respective shim element, the greater the reduction in the cavity cross-section.

13. A thumb-mountable protective utensil kit comprising:
 a housing including an upper portion, a lower portion, a cavity defined generally therebetween, a forward end, an open rearward end, the cavity being configured to generally conformingly receive a tip segment of a human thumb by way of the open rearward end for releasable securement of the tip segment within the cavity such that the palmar aspect of the thumb faces the lower portion, the upper and lower portions being separate components attachable to one another, the lower portion including two laterally-opposed shoulders at least partially defining laterally-disposed utensil mount grooves, the lower portion having a curved surface and a multiplicity of spikes extending outwardly therefrom in respective directions normal to the curved surface; and
 a clip element adapted to slidingly engage each of the shoulders and extend across at least a portion of an outer surface of the upper portion for releasably securing the upper portion to the lower portion, the clip element being formed of metal.

14. A thumb-mountable protective utensil kit as defined in claim 13 further comprising a multiplicity of shim elements substantially made of resiliently compressible material and having respective thicknesses which vary from one another, and wherein
 the housing includes a first axis extending from the forward end toward the open rearward end;
 the cavity has a cavity cross-section being generally orthogonal to the first axis; and
 the shim elements are each removably attachable to the housing for reducing the cavity cross-section such that the greater the thickness of the respective shim element, the greater the reduction in the cavity cross-section.

15. A thumb-mountable protective utensil kit as defined in claim 13 further comprising a utensil mount adapted to slidably engage the utensil mount grooves, the utensil mount having a peeling utensil connected thereto.

* * * * *